United States Patent
Jellema et al.

(10) Patent No.: US 6,707,900 B1
(45) Date of Patent: Mar. 16, 2004

(54) DYNAMIC LOAD LIMITING

(75) Inventors: Bart Jellema, Rijen (NL); Rene Peeren, Osterhart (NL); Louise Croughan, Osterhart (NL); Freek Aben, Rykevoort (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/214,898

(22) PCT Filed: Jul. 16, 1997

(86) PCT No.: PCT/EP97/03788

§ 371 (c)(1),
(2), (4) Date: May 6, 1999

(87) PCT Pub. No.: WO98/04078

PCT Pub. Date: Jan. 29, 1998

(30) Foreign Application Priority Data

Jul. 19, 1996 (GB) ............................................. 9615149

(51) Int. Cl.$^7$ ................................................. H04M 7/00
(52) U.S. Cl. ............................ 379/221.08; 379/112.04; 379/133; 379/139
(58) Field of Search ................................. 379/133, 134, 379/139, 115, 266, 207.02, 221.08, 221.09, 221.12, 32.01, 112.04

(56) References Cited

U.S. PATENT DOCUMENTS

| | | |
|---|---|---|
| 5,042,064 A | 8/1991 | Chung et al. |
| 5,212,727 A | 5/1993 | Ramkumar |
| 5,249,223 A | 9/1993 | Vanacore |
| 5,359,649 A | 10/1994 | Rosu et al. |
| 5,425,086 A | 6/1995 | Hidaka et al. |
| 5,438,568 A | 8/1995 | Weisser, Jr. |
| 5,450,483 A * | 9/1995 | Williams ............... 379/112.04 |
| 5,581,610 A * | 12/1996 | Hooshiari ................... 379/133 |
| 5,828,729 A * | 10/1998 | Clermont et al. ........ 379/32.01 |
| 5,878,224 A * | 3/1999 | Smith ......................... 709/224 |
| 5,923,742 A * | 7/1999 | Kodialam et al. .......... 379/133 |
| 5,974,126 A * | 10/1999 | Hollas et al. ............... 379/137 |

FOREIGN PATENT DOCUMENTS

| | | |
|---|---|---|
| WO | WO 95/08236 | 3/1995 |
| WO | WO 96/11551 | 4/1996 |

OTHER PUBLICATIONS

Henrik Nyberg et al., "On Load Control of an SCP in the Intelligent Network", pp. 751–756, Dec. 1994.

Maria Kihl et al., "A Study of Methods for Protecting an SCP from Overload", pp. 125–129, Mar. 1995.

X.H. Pham, "Congestion Control for Intelligent Networks", pp. 375–389, Mar. 1992.

N. Tsolas et al., "Performance and Overload Considerations when Introducing in into an Existing Network", pp. 407–414, Jan. 1992.

Hitoshi Kawamura et al., "A Congestion Control System for an Advanced Intelligent Network".

European Patent Abstract EP 334–612–A.
European Patent Abstract EP 449–480–A.
World Intellectual Property Organization Abstract WO 94/23543.
Great Britain Patent Abstract GB 2–236–641–A.
Japanese Patent Abstract 58–114689.

(List continued on next page.)

*Primary Examiner*—Ahmad F. Matar
*Assistant Examiner*—Bing Bui

(57) ABSTRACT

A service switching point counts the number of pending queries sent to a service control point and awaiting a response. When the counted number reaches a threshold, further call attempts are rejected. This prevents the load on the service control point from becoming excessive.

9 Claims, 2 Drawing Sheets

OTHER PUBLICATIONS

Figure 1:
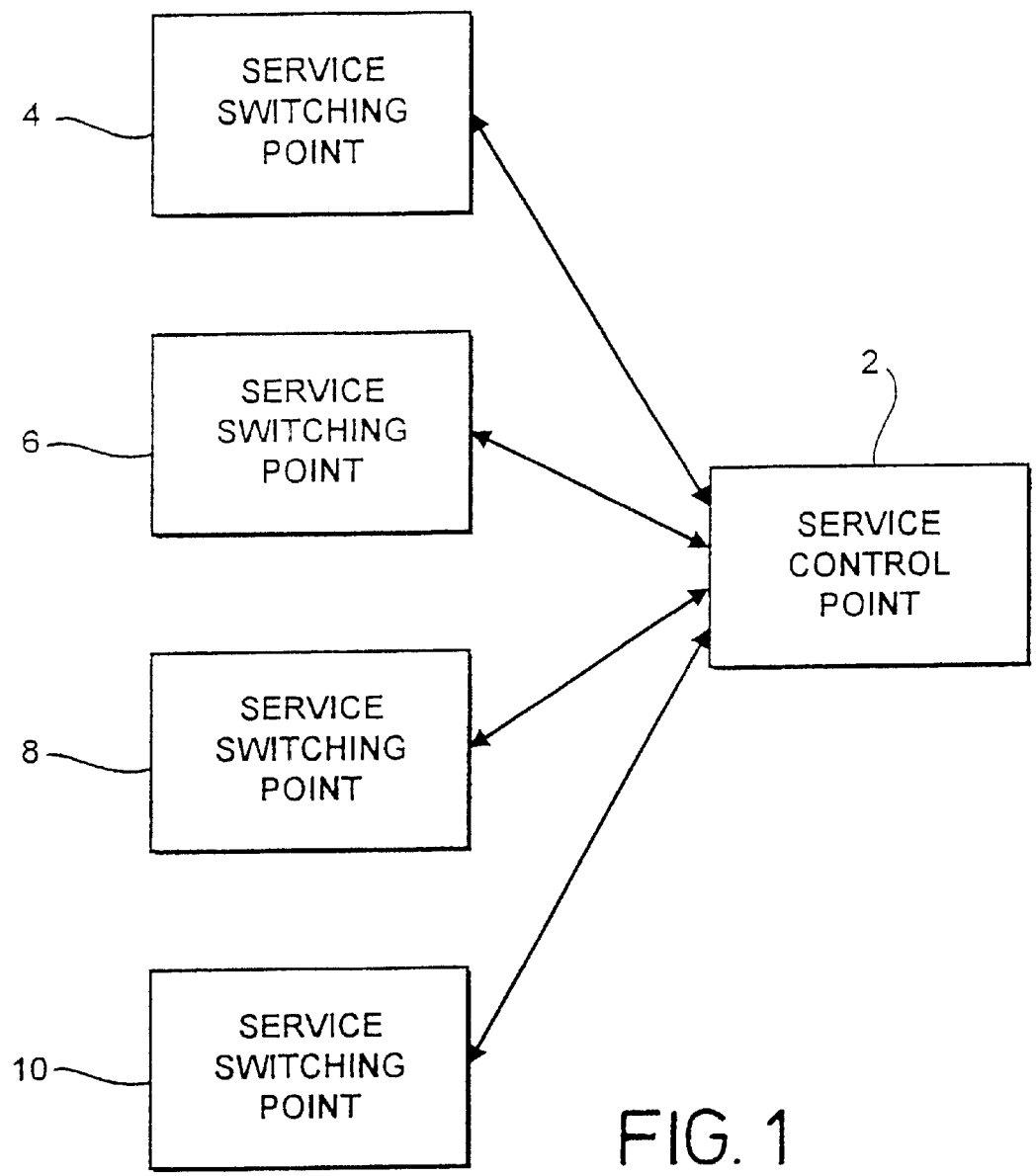

Japanese Patent Abstract 06–113009.
Japanese Patent Abstract 06–133345.
World Intellectual Property Organization Abstract WO 87/03763.
World Intellectual Property Organization Abstract WO 89/05552.
World Intellectual Property Organization Abstract WO 90/01237.
World Intellectual Property Organization Abstract WO 93/23962.
World Intellectual Property Organization Abstract WO 95/14341.
World Intellectual Property Organization Abstract WO 94/00958.

* cited by examiner

DYNAMIC LOAD LIMITING

This invention relates to a mechanism for limiting the load on a central point in a network architecture. In particular, the illustrated embodiment of the invention relates to a mechanism for limiting the load on a Service Control Point in an Intelligent Networks architecture.

An Intelligent Networks architecture includes a Service Control Point (SCP), which typically has a large number of Service Switching Points (SSP) connected to it. Each SSP is a switching system that can intercept telephone calls, and query the SCP. The SCP contains service specific logic and data, that allows it to return instructions to the SSP on how to deal with the intercepted call.

Clearly, if the SCP receives an excessive number of simultaneous queries from different SSPs, congestion may arise in the network's signalling links, the processing capability of the SCP may be overloaded, and unacceptable delays in processing the calls may result.

In an existing Intelligent Network specification, ETS 300 374-1, at pages 136–139, call gapping is provided as the only means to reduce signalling traffic sent towards SCPs.

When a SCP detects a high load condition, it sends instructions back to some or all SSPs to begin call gapping, meaning that those SSPs reduce the rate at which they are allowed to send queries to the SCP. However, this mechanism is rather inefficient, because of the delays which exist between the detection of the high load condition by the SCP and the time at which call gapping is initiated by the SSP. The result is that an unexpected peak in the number of SCP queries can still cause the SCP to be overloaded.

In accordance with other existing Intelligent Networks, the SSP has a dynamic mechanism for monitoring the load condition of the SCP, and preventing overload. This is achieved by defining a ceiling for the number of SCP queries awaiting a response, and rejecting call attempts which would take the number of pending queries above that ceiling. Such systems are disclosed in:

1. "On load control of an SCP in the Intelligent Network", NYBERG et al, proceedings of the Australian Telecommunication Networks and Applications conference, vol. 2, Jan. 1st, 1994, pages 751–756.

2. "A study of methods for protecting an SCP from overload", KIHL et al, IEE conference on Telecommunications, Mar. 26th, 1995, pages 125–129.

3. "Congestion control for Intelligent Networks", PHAM et al, International Zurich seminar on Digital Communications Intelligent Networks and their applications, Mar. 16th, 1992, pages 375–389.

4. "Performance and overload considerations when introducing IN into an existing network", TSOLAS et al, International Zurich seminar on Digital Communications Intelligent Networks and their applications, Jan. 1st, 1992, pages 407–414.

These have the advantage that the SSP can automatically react to a change in the load condition of the SCP, without requiring any message to be sent from the SCP, allowing faster reaction to an unexpected burst of call attempts.

However, these systems suffer from the disadvantage that the ceiling (or threshold) is only reduced after the system has entered the overload condition. The present invention overcomes this disadvantage by taking corrective action before the overload condition is entered, as will be described below.

Figure 2:
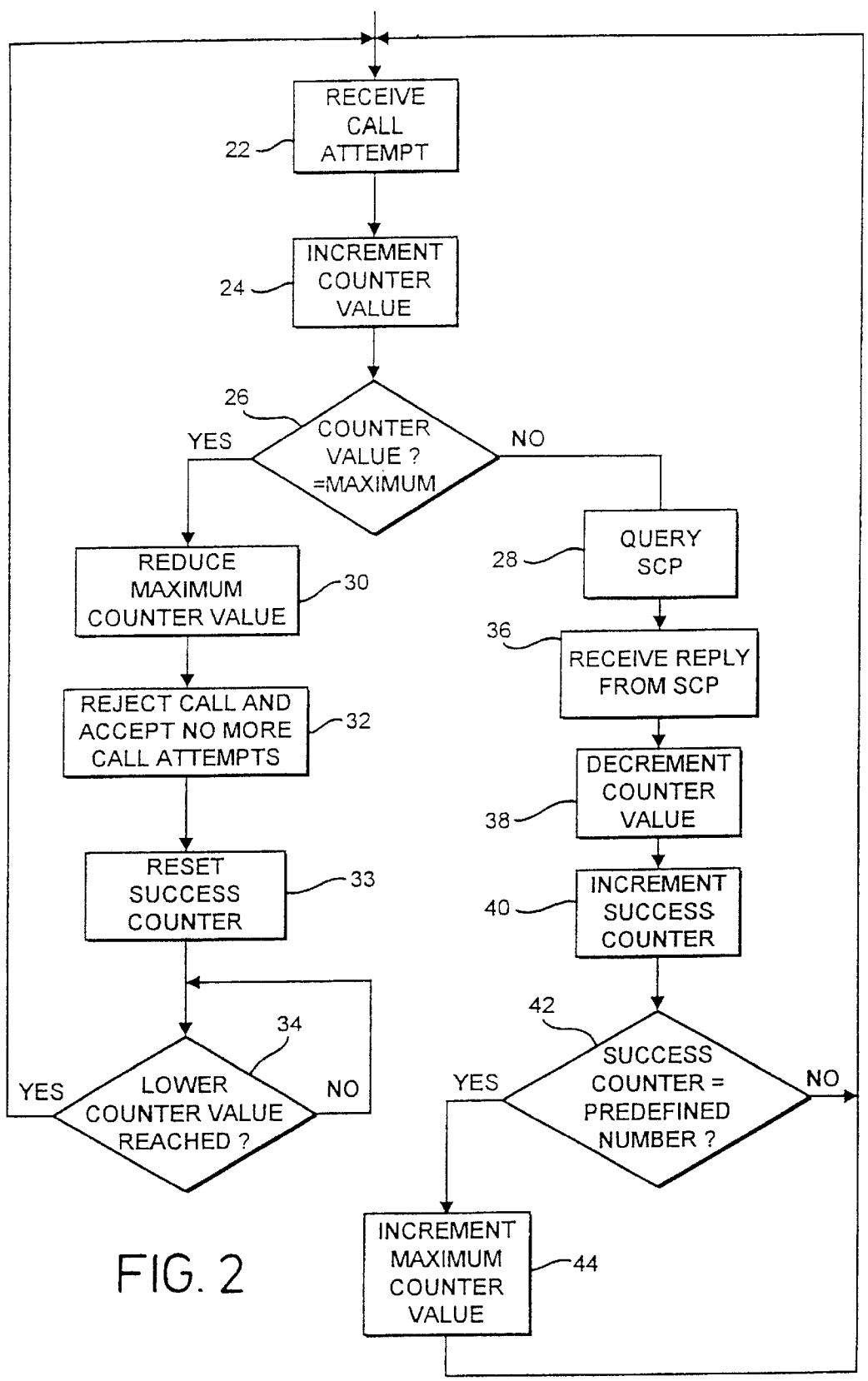

For a better understanding of the present invention, reference will now be made, by way of example, to the accompanying drawings, in which:

FIG. 1 is a block schematic diagram of a network architecture implementing the present invention; and FIG. 2 is a flow diagram illustrating a part of the operation of a SSP in accordance with the present invention.

The network architecture illustrated in FIG. 1 comprises a Service Control Point (SCP) 2, to which are connected a number of Service Switching Points (SSPs) 4, 6, 8, 10. It will be appreciated, that, in practice, the number of SSPs connected to a SCP will be large. In the Intelligent Networks architecture, the SSP intercepts telephone calls, and sends queries to the SCP. The SCP returns instructions to the SSP on how further to treat the intercepted call.

FIG. 2 is a flow chart which shows how a SSP may implement the call limiting mechanism in accordance with the invention. Within the SSP, a counter may be allocated to a given set of call criteria, such as a particular dialled number. For each counter, a predetermined maximum value, i.e. a ceiling, is set.

In the process shown in FIG. 2, in step 22, a call attempt is received at the SSP matching one of the criteria. In step 24, the corresponding counter value is incremented. In step 26, it is determined whether the counter value has reached its predetermined maximum value. If it has not, the query is sent to the SCP in step 28. As soon as a reply is received from the SCP on a pending query, in step 36, the corresponding counter value is decremented in step 38.

A success counter, representing the number of consecutive queries which have been successfully responded to, is incremented in step 40. It is then determined in step 42 whether the success counter has reached a predefined number. If so, the defined maximum counter value is automatically raised by a predefined increment in step 44. The process then returns to the start.

If it is determined in step 26 that the counter value has reached its predetermined maximum value, it is an indication that the SCP is in a high load condition, with a correspondingly increased response time to queries. In order to deal with this problem, in step 30 the determined maximum counter value is reduced by a predefined decremental step. Then, in step 32, the received call is rejected, and no further call attempts are accepted. The success counter is also reset to zero in step 33. While in this state, as shown in step 34, the counter value is monitored, until it reaches a lower value, which is a certain percentage below the present determined maximum counter value. When this lower value is reached, i.e. the answer YES is obtained in step 34, the SSP is again able to answer call attempts, and the process returns to the start.

This mechanism can retain in place permanently, or may be activated either manually at the SSP, or by means of an instruction sent to the SSP from the SCP. Moreover, the setting of the initial maximum value for the counter can similarly be set either manually at the SSP, or by means of instruction from the SCP.

There is thus provided a mechanism which allows an SSP to adjust automatically to the load on the SCP, without requiring messages to be sent from the SCP. The fact that there always exists a maximum value for the counter means that the mechanism is always able to deal with sudden bursts of call attempts.

Although the invention has been described above in terms of an Intelligent Networks telecommunications architecture, with the SSP containing the mechanism for limiting the queries sent to a SCP, it will be appreciated that a similar mechanism can be used in any network architecture which requires queries to be sent to a centralised database or control point, for example in mobile telecommunication networks, credit card databases, or computer networks.

What is claimed is:

1. A switching point, for use in a network architecture having a central control point and a plurality of switching points connected thereto, the switching point comprising:
   means for sending queries to the control point and for receiving responses from the control point;
   means for counting the number of pending queries which have been sent to the control point and are awaiting a response; and
   means for preventing additional queries from being sent to the control point when the number of pending queries reaches a threshold value,
   wherein said threshold value is decreased when the number of pending queries reaches said threshold value.

2. A switching point according to claim 1, further comprising:
   means for increasing the threshold value when a predetermined number of consecutive queries receive successful responses.

3. A switching point according to claim 1, further comprising:
   means for counting a number of pending queries belonging to each of a plurality of categories.

4. A method of handling a telephone call in a switching point wherein the switching point forms part of a network architecture having a central control point and a plurality of switching points connected thereto wherein the control point handles queries sent from the plurality of switching points, said method comprising the steps of:
   receiving a call attempt;
   incrementing a counter value in response to the call attempt;
   decrementing the counter value whenever a query receives a response from the control point;
   comparing the counter value with a predetermined threshold; and
   sending a query to the control point if the counter value is lower than said threshold value, otherwise, rejecting the call attempt wherein
   said threshold value is decreased when the number of pending queries reaches said threshold value.

5. A method according to claim 4, further comprising the step of:
   selectively incrementing a value of one of a plurality of counters based on determining whether a call attempt meets one of a plurality of predetermined criteria.

6. A method according to claim 5, wherein each counter value, associated with a respective predetermined criterion, has a respective predetermined threshold.

7. A network architecture comprising a central control point and a plurality of switching points connected thereto, wherein each switching point comprises:
   means for sending queries to the control point and for receiving responses from the control point;
   means for counting the number of pending queries which have been sent to the control point and are awaiting a response; and
   means for preventing additional queries from being sent to the control point when the number of pending queries reaches a threshold value, wherein said threshold value is decreased when the number of pending queries reaches said threshold value.

8. An architecture according to claim 7, further comprising:
   a means for increasing the threshold value when a predetermined number of consecutive queries receive successful responses from the control point.

9. An architecture according to claim 7, further comprising:
   means for counting a number of pending queries belonging to each of a plurality of categories.

* * * * *